United States Patent
Uy et al.

(10) Patent No.: US 11,388,594 B2
(45) Date of Patent: Jul. 12, 2022

(54) MUTUAL AUTHENTICATION BETWEEN WIRELESS ACCESS DEVICES

(71) Applicant: Verizon Patent and Licensing Inc., Arlington, VA (US)

(72) Inventors: Warren Hojilla Uy, Randolph, NJ (US); Young R. Choi, Belle Mead, NJ (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 121 days.

(21) Appl. No.: 16/191,130

(22) Filed: Nov. 14, 2018

(65) Prior Publication Data
US 2020/0154272 A1  May 14, 2020

(51) Int. Cl.
*H04L 9/08* (2006.01)
*H04L 9/30* (2006.01)
(Continued)

(52) U.S. Cl.
CPC .............. *H04W 12/06* (2013.01); *H04L 9/085* (2013.01); *H04L 9/0844* (2013.01);
(Continued)

(58) Field of Classification Search
CPC .............. H04L 63/0869; H04L 63/0823; H04L 9/3263; H04L 63/101; H04L 9/085; H04L 9/0844; H04L 9/3066; H04L 2209/80; H04L 9/3273; H04W 12/06; H04W 92/20; H04W 84/12; H04W 76/10; H04W 12/04; H04W 12/08
See application file for complete search history.

(56) References Cited

U.S. PATENT DOCUMENTS

| 10,169,587 B1* | 1/2019 | Nix | H04L 63/08 |
| 2002/0191797 A1* | 12/2002 | Perlman | H04L 9/088 |
| | | | 713/153 |

(Continued)

OTHER PUBLICATIONS

Gemalto, "Benefits of Elliptic Curve Cryptography," Mar. 2012, http://www.securitydocumentworld.com/creo_files/upload/client_files/gov_wp_ecc1.pdf.

(Continued)

*Primary Examiner* — Fatoumata Traore
*Assistant Examiner* — Hamid Talaminaei

(57) ABSTRACT

A first wireless access device, associated with a wireless service provider, establishes a wireless local area network connection with a second wireless access device and receives a certificate including a unique identifier associated with the second wireless access device. The first wireless access device determines whether the second wireless access device is authorized to connect to the first wireless access device. For example, if the certificate is signed by a certificate authority associated with the wireless service provider and the unique identifier appears in a whitelist stored at the first wireless access device, the first wireless access device and the second wireless access device perform a mutual authentication procedure based on one or more ephemeral keys. The first wireless access device provides the second wireless access device with access to a wide area network based on successful completion of the mutual authentication procedure.

20 Claims, 9 Drawing Sheets

(51) Int. Cl.
- *H04L 9/32* (2006.01)
- *H04L 9/40* (2022.01)
- *H04W 12/06* (2021.01)
- *H04W 12/04* (2021.01)
- *H04W 12/08* (2021.01)
- *H04W 76/10* (2018.01)
- *H04W 84/12* (2009.01)
- *H04W 92/20* (2009.01)
- *H04W 12/069* (2021.01)

(52) U.S. Cl.
CPC .......... *H04L 9/3066* (2013.01); *H04L 9/3263* (2013.01); *H04L 63/0823* (2013.01); *H04L 63/0869* (2013.01); *H04L 63/101* (2013.01); *H04W 12/04* (2013.01); *H04W 12/08* (2013.01); *H04W 76/10* (2018.02); *H04L 2209/80* (2013.01); *H04W 84/12* (2013.01)

(56) References Cited

U.S. PATENT DOCUMENTS

| | | | |
|---|---|---|---|
| 2005/0149759 A1* | 7/2005 | Vishwanath | G06F 21/121 726/4 |
| 2009/0222659 A1* | 9/2009 | Miyabayashi | H04L 63/0823 713/175 |
| 2010/0250922 A1* | 9/2010 | Bao | H04W 12/069 713/158 |
| 2018/0205722 A1* | 7/2018 | Getschmann | H04L 63/0823 |
| 2019/0044737 A1* | 2/2019 | Singhi | H04L 63/0823 |
| 2019/0313246 A1* | 10/2019 | Nix | H04L 9/3247 |
| 2020/0204527 A1* | 6/2020 | Vass | G06Q 20/3567 |

OTHER PUBLICATIONS

Federal Office for Information Security, "Technical Guideline BSI TR-03111: Elliptic Curve Cryptography," Version 2.10, Jun. 1, 2018.

* cited by examiner

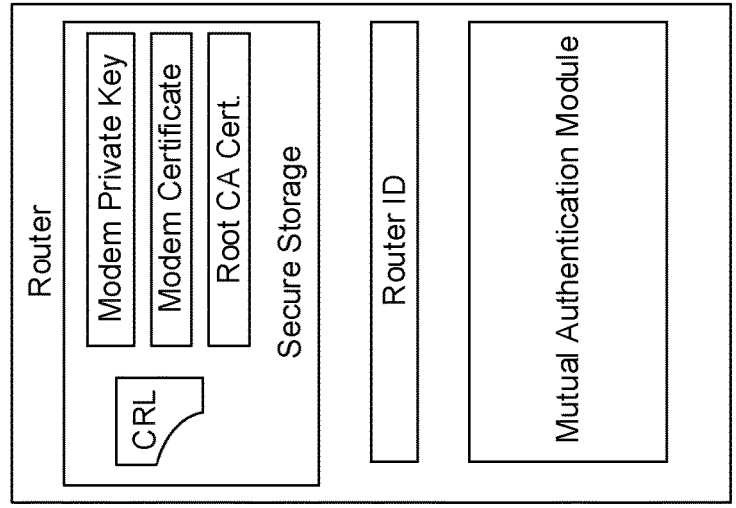
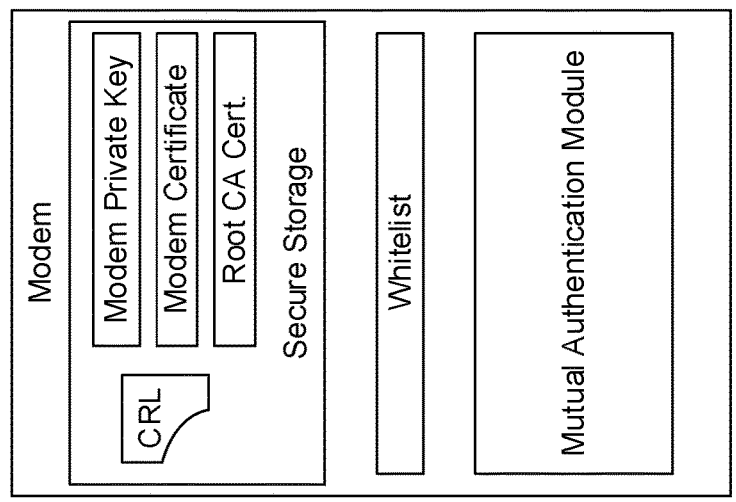
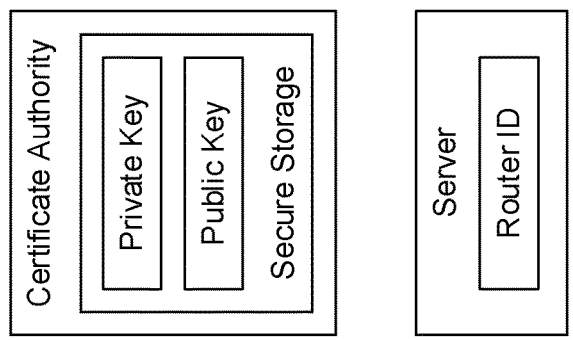
FIG. 1A

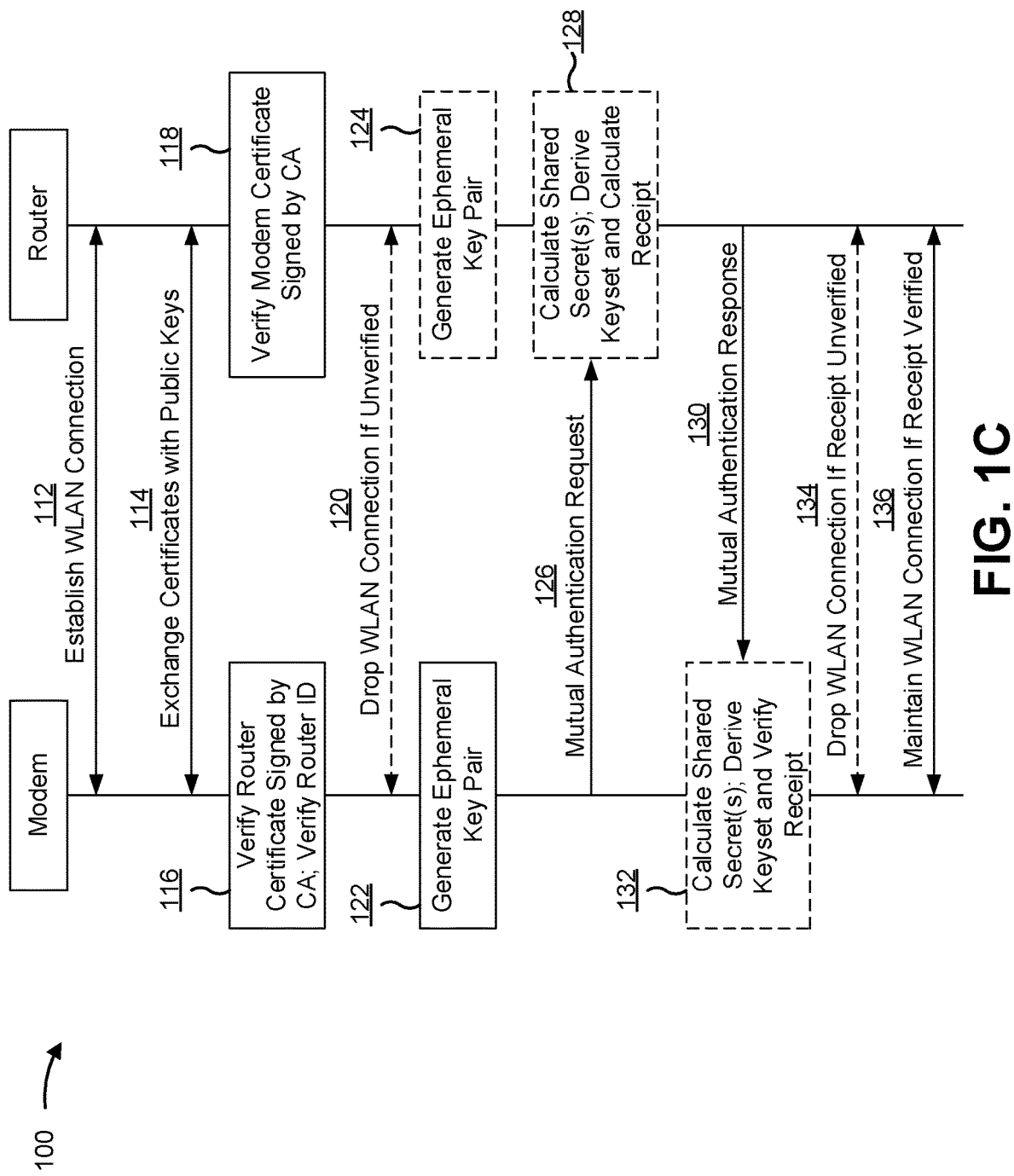

MUTUAL AUTHENTICATION BETWEEN WIRELESS ACCESS DEVICES

BACKGROUND

The term customer-premises equipment (CPE) generally refers to any device that is installed or otherwise located at a customer's premises (e.g., a residence, a business, etc.) and is connected to an infrastructure operated by a communications service provider. For example, CPEs can include devices, such as modems that deliver broadband network access, routers, or other gateway devices that enable consumers to access services offered by a communications service provider and distribute the services via a local area network. Furthermore, CPEs can refer to devices that terminate a wide area network (WAN) circuit and can include customer-owned hardware or hardware that a service provider provides to a customer.

BRIEF DESCRIPTION OF THE DRAWINGS

FIGS. 1A-1D are diagrams of an example implementation described herein.

DETAILED DESCRIPTION OF PREFERRED EMBODIMENTS

Figure 1B:
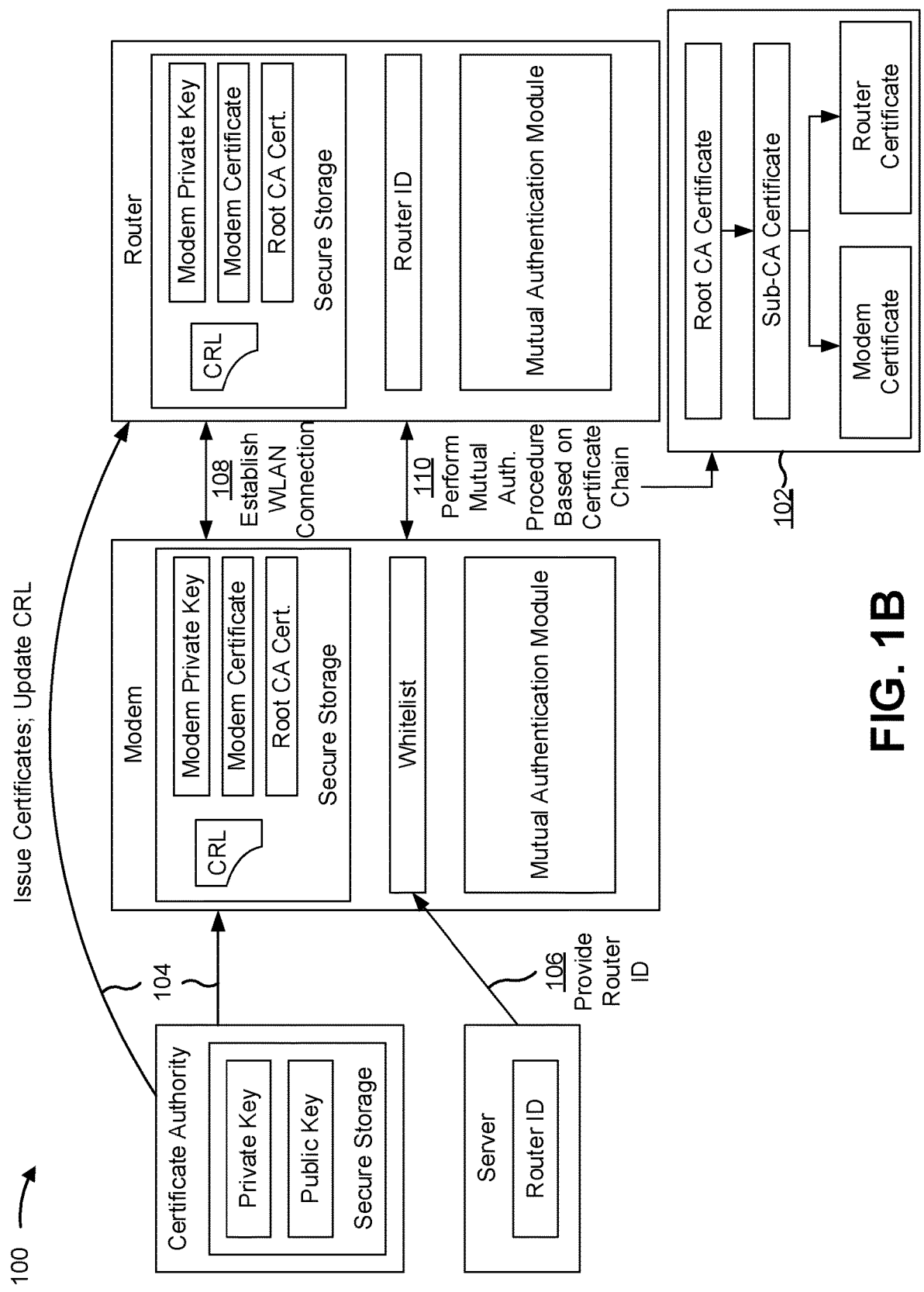

The following detailed description of example implementations refers to the accompanying drawings. The same reference numbers in different drawings can identify the same or similar elements.

When a service provider deploys equipment at a customer premises to provide a customer with wide area network (WAN) access, the deployed equipment often includes multiple devices (or boxes) that are installed at the customer premises. For example, in some deployments, the devices installed at the customer premises might include a router that serves as a network gateway and a modem that provides WAN connectivity to the router via a wired (e.g., Ethernet) connection and/or a wireless (e.g., wireless local area network (WLAN)) connection. Furthermore, the router typically acts as a Dynamic Host Configuration Protocol (DHCP) server and provides an access point that wired and/or wireless devices (e.g., user devices, network extenders, and/or the like) can use to access the WAN.

When the modem and the router are connected over a wired connection, there are generally fewer security concerns relative to a WLAN connection. For example, standard WLAN setup mechanisms use a service set identifier (SSID) and password to ensure that only authorized devices can connect to the WLAN. However, the standard mechanism to establish a WLAN connection between a modem and a router is Wi-Fi Protected Setup (WPS), which simplifies setup through use of a PIN. However, WPS has well-documented security vulnerabilities, including flaws that allow an attacker to recover the PIN via a brute-force attack and consequently use the PIN to obtain the pre-shared key used to secure the WLAN.

Accordingly, anyone, who has access to the PIN and can trigger WPS functionality, will be able to connect their device(s) to the modem. This security risk is especially prevalent in scenarios where the modem is a fixed device that is deployed outdoors or in another publicly-accessible location (e.g., when the modem is deployed to provide connectivity to a wireless WAN, such as a cellular network). In such cases, anyone can theoretically snoop and push the physically-accessible button to trigger WPS functionality and/or read the PIN that is often printed on the modem. In addition to raising significant security concerns because the unauthorized device can potentially gain rogue access to the traffic passing between the modem and the router, the unauthorized device could potentially obtain data connectivity via the WAN at no charge, which can increase network congestion due to unauthorized traffic and cause economic harm to the service provider deploying the modem, among other things.

Some implementations described herein relate to a mutual authentication protocol between wireless access devices (e.g., a modem that provides WAN connectivity and a router that connects to the modem and serves as a gateway for other devices to access the WAN). In some implementations, the mutual authentication protocol adds further security to whichever technique is used to establish the WLAN connection between the wireless access devices (e.g., WPS). For example, as will be described in further detail herein, the mutual authentication protocol can use asymmetric keys and certificates and Diffie-Hellman cryptography to mutually authenticate the wireless access devices. More particularly, Diffie-Hellman cryptography allows the wireless access devices to jointly establish a shared secret key over an insecure channel. The established shared secret key can be used to encrypt subsequent communications between the wireless access devices. Furthermore, the modem can be configured to block access to the WAN until the mutual authentication protocol has been successfully performed, and the WLAN connection between the modem and the router will be dropped if authentication fails. In this way, the mutual authentication procedure offers improved security, as only legitimate (i.e., authorized) devices can establish a connection to the wireless access device providing WAN connectivity.

Furthermore, a service provider deploying the wireless access devices at a customer premises can be assured that no unauthorized users or other devices will have the ability to communicate with the deployed wireless access device(s), as any third-party connections to the wireless access device(s) are blocked (i.e., connectivity is limited to certain wireless access devices, such as routers and extenders, that the service provider has specifically designated as authorized). In this way, the mutual authentication protocol can further reduce network congestion because unauthorized data traffic is blocked. In addition, because unauthorized users or devices will not have the ability to obtain data connectivity for free, the mutual authentication protocol described herein can prevent free-rider problems that could otherwise lead to over-consumption of network resources by unauthorized users or devices.

FIGS. 1A-1D are diagrams of an example implementation 100 described herein. For example, example implementation 100 includes a pair of wireless access devices, including a first wireless access device that provides connectivity to a wide area network (WAN) and a second wireless access device that serves as a gateway to provide access to the WAN for other wired and/or wireless devices (e.g., user devices, network extenders, and/or the like). For example, as shown in FIG. 1A, the first wireless access device might be a modem that a network service provider provides for installation at a customer premises, a customer-purchased modem that the network service provider authorizes for installation at the customer premises, and/or the like. Similarly, the second wireless access device can be a router that the network service provider provides for installation at the customer premises, a customer-purchased router that the network service provider authorizes for installation at the customer premises, and/or the like. In addition, as shown in FIG. 1A, the example implementation 100 includes a certificate authority associated with the network service provider. The certificate authority issues certificates that can be used to certify ownership of a public key by a named subject of the certificate such that other parties can rely upon signatures or assertions made about a private key that corresponds to the certified public key. Further still, the example implementation 100 includes a server that provisions the modem with a unique identifier that has been issued to the router (e.g., a Media Access Control (MAC) address, a serial number, and/or another suitable unique identifier).

In some cases, as described in further detail herein, the pair of first and second wireless access devices (referred to herein as "modem" and "router" for the sake of convenience) perform a mutual authentication protocol to ensure that the network service provider has appropriately authorized the router to connect to the modem. In this way, the mutual authentication protocol can enable the modem to verify that the router is a device that the network service provider has authorized to communicate with the modem and further enable the router to verify that the modem is a device that the network service provider has authorized to communicate with the router. In this way, security of the connection between the modem and the router can be improved, network congestion can be reduced by blocking traffic to or from unauthorized devices, and/or the like relative to prior techniques that establish a connection between a model and a router.

In some implementations, the mutual authentication protocol can use asymmetric keys and certificates and Diffie-Hellman cryptography as an additional security measure implemented over and above a mechanism used to establish a wireless local area network (WLAN) connection between the modem and the router (e.g., Wi-Fi Protected Setup (WPS)). In the example implementation 100, the mutual authentication protocol is described as using Elliptic Curve keys and certificates as examples, although Rivest-Shamir-Adleman (RSA) cryptography can also be applied. However, Elliptic Curve cryptography offers certain additional benefits over RSA, such as a smaller key size for equivalent security, the potential to implement without a crypto processor, and faster execution in some cases. For example, Elliptic Curve cryptosystems decrease the required key-size to achieve appropriate security, in that an RSA algorithm using a 2048-bit key and an Elliptic Curve cryptosystem using a 224-bit key can offer a substantially equivalent security level. In this way, the Elliptic Curve keys occupy less storage space than RSA keys without any compromise to the security level, which can result in faster computation, lower power consumption, and memory and bandwidth savings. Furthermore, Elliptic Curve key generation is substantially simpler than RSA key generation, which might allow computations to occur in an acceptable timeframe without the use of a crypto processor, leading to lower production costs and cheaper designs with the same level of security.

As shown in FIG. 1A, the certificate authority, the modem, and the router each includes secure storage that contain one or more keys and certificates that are pre-provisioned. For example, the one or more keys can include private keys (sometimes called "secret keys") that are designed not to exit or otherwise be exposed outside the secure storage containing the private keys. In some implementations, the private keys issued to the certificate authority, the modem, and the router can be injected in a secure environment at device manufacturing time to provide additional private key security.

As shown in FIG. 1B, and by reference number 102, a certificate chain can be used when the modem and the router perform the mutual authentication procedure described in further detail herein. For example, the certificate chain generally includes a root certificate authority (CA) certificate and a subordinate certificate authority (sub-CA) certificate. The root certificate authority can create the subordinate certificate authority to issue or otherwise distribute certificates to other devices. In this way, if the subordinate certificate authority is compromised for any reason, the root certificate authority can simply revoke the subordinate certificate authority and create one or more new subordinate certificate authorities to issue or otherwise distribute certificates, thus improving security of the root certificate authority. The certificate chain can therefore further include a modem certificate and a router certificate, each of which is issued by the subordinate certificate authority.

As shown in FIG. 1B, and by reference number 102, the certificate chain can have a hierarchical tree structure in which the root certificate authority certificate can represent a trusted anchor for other certificates. In particular, the root certificate authority can use its private key to self-sign the root certificate authority certificate and also use its private key to sign the subordinate certificate authority certificate. In some implementations, the subordinate certificate authority can use its private key to sign the modem certificate and the router certificate. In this regard, the certificate chain can include a sequence of certificates in which each certificate can be signed using the private key of its issuer, thus producing a digital signature that can be used to verify that the certificate was created by a known entity (i.e., the issuer) and that the certificate was not altered in transit. The digital signature can be verified using the public key in the issuer's certificate, which is the next certificate in the chain. In this way, the certificate chain can trace a path of a certificate to the root in the hierarchical tree structure. Accordingly, when the modem and the router perform the mutual authentication procedure to be described in further detail below, the modem can trace the path of the certificate issued to the router to verify that the certificate issued to the router leads to the root certificate authority certificate that was self-signed by the root certificate authority, and vice versa. In this way, the modem and the router can mutually verify that one another are associated with the same network service provider such that the modem allows connections from only the router(s) that the network service provider has designated or otherwise authorized to communicate with the modem, and vice versa.

As shown in FIG. 1B, and by reference number 104, the certificate authority (e.g., via the subordinate certificate authority) can issue a certificate to the modem and further issue a certificate to the router. In some implementations, the modem and the router can each store the certificate issued thereto in their secure storage. Each certificate can include a public key and one or more unique identifiers associated with an owner of the certificate (e.g., the device to which the certificate was issued). For example, the certificate issued to the modem can include a public key that the certificate authority issued to the modem and an International Mobile Equipment Identity (IMEI) used to identify the modem on a wireless wide area network (WWAN) (e.g., a cellular network). Furthermore, the certificate issued to the router can include a public key that the certificate authority issued to the router and a Media Access Control (MAC) address, as the router can be configured to communicate only over a wired and/or wireless LAN and therefore might not have an IMEI. Additionally, or alternatively, the one or more unique identifiers can include other suitable identifiers, such as serial numbers and/or the like. Furthermore, the certificate authority can make the root certificate authority certificate (including the public key of the root CA certificate) available to the modem and the router for use during the mutual authentication procedure described in further detail herein.

As shown in FIG. 1B, and by reference number 104, the certificate authority can update a certificate revocation list (CRL) at the modem and the router on a periodic or otherwise dynamic basis. In particular, the CRL can serve as a type of blacklist to identify one or more certificates that the certificate authority no longer deems trustworthy. For example, the certificate authority might revoke a certificate that was improperly issued, discovered to be counterfeit, associated with a private key that has been compromised (e.g., lost or stolen), issued by a compromised subordinate certificate authority, owned by a subject that failed to adhere to one or more policies, and/or the like. As such, when the certificate authority revokes a certificate, the certificate authority can add the revoked certificate to the CRL at the modem and the router. Additionally, or alternatively, the certificate authority can periodically provide a current version of the CRL to the modem and the router (e.g., at defined intervals). Accordingly, in some implementations, the modem and the router can be configured to drop or reject connections from devices having certificates that appear in the CRL. In this way, the certificate authority can update the CRL at the modem and the router to prevent connections from devices using certificates that appear in the CRL because the certificate authority no longer deems such certificates to be trustworthy, thus improving security and preventing unauthorized or malicious activity.

As shown in FIG. 1B, and by reference number 106, the server can provision the modem with one or more unique identifiers associated with the router (e.g., a MAC address, a serial number, and/or the like) in order to pair the modem with the router, which may occur prior to, concurrently with, and/or subsequent to the certificate authority issuing the certificates to the modem and the router. In some implementations, the modem can be provisioned with the one or more unique identifiers associated with the paired router to prevent connections from nearby routers that are associated with the same network service provider (e.g., a neighboring residence, business, and/or the like). In some implementations, the server might provision the modem with the one or more unique identifiers associated with the router over-the-air when the modem initially boots up, over a wired connection when the modem initially boots up, at a premises associated with the network service provider, and/or the like. For example, when the modem boots up, the modem may contact the server via a wireless and/or wired connection to request the one or more unique identifiers associated with the router that the network service provider has paired with the modem. The server may provide the one or more unique identifiers associated with the paired router to the modem, which can store the provisioned one or more unique identifiers in a whitelist. Additionally, or alternatively, the modem can be connected to the server at the premises associated with the network service provider in order to pair the modem with the router prior to installation at the customer premises. Additionally, or alternatively, the server can push the one or more unique identifiers associated with the router to the modem based on one or more conditions being satisfied (e.g., when the router is replaced due to an upgrade, malfunction, when a device instructs the server to provide the one or more unique identifiers, when an operator instructs the server to provide the one or more unique identifiers, and/or the like).

In some implementations, as noted above, the modem can store the provisioned one or more unique identifiers in a whitelist, which can represent specific devices that the network service provider has authorized to communicate with the modem (e.g., devices that are associated with a same customer account). The modem can therefore block and/or drop connections from devices that do not have a unique identifier that appears in the whitelist. In this way, even if an unauthorized device has compromised or otherwise obtained the certificate issued to the router, the unauthorized device will be unable to connect to the modem. Furthermore, in this way, the modem can prevent accidental and/or inadvertent connections from other devices that have certificates issued by the certificate authority operated by the network service provider (e.g., other devices of a neighboring residence and/or business that also has an account with the network service provider). In this way, the modem can be configured to allow connections from only devices that have a unique identifier stored in the whitelist such that connectivity can be limited to those devices that have been specifically paired or otherwise authorized to communicate with the modem, thus further improving security and preventing activity from unauthorized or malicious devices.

As shown in FIG. 1B, and by reference number 108, the modem and the router can initially establish a WLAN connection (e.g., via WPS). Once the WLAN connection is established, as shown by reference number 110, the modem and the router can perform the mutual authentication procedure based at least in part on the certificate chain. For example, in some implementations, the mutual authentication procedure can include a first phase in which the modem can drop the WLAN connection with the router if the modem is unable to verify that the router has a certificate issued by the certificate authority. Additionally, or alternatively, the modem can drop the WLAN connection with the router if a unique identifier belonging to the router (e.g., a MAC address, serial number, and/or the like) does not appear in the whitelist stored at the modem. Similarly, the router can drop the WLAN connection with the modem during the first phase if the router is unable to verify that the modem has a certificate issued by the certificate authority. In this way, the modem and the router can mutually determine that the network service provider has specifically authorized communication with the other device; otherwise connectivity can be dropped.

In some implementations, the mutual authentication procedure can further include a second phase that can be performed if the modem and the router mutually authenticate one another in the first phase. More particularly, as described in further detail below, the modem and the router can mutually authenticate one another in the second phase using one-time use ephemeral keys. For example, in some implementations, connectivity can be maintained and the router can be provided with the ability to access a WAN if the mutual authentication during the second phase is successful. Alternatively, if either the first phase or the second phase of the mutual authentication fails, the connection can be dropped. In this way, the mutual authentication procedure can provide substantial assurances that the network service provider has specifically authorized communication between the modem and the router, thus improving security, blocking or preventing unauthorized network activity, and/ or the like.

As shown in FIG. 1C, and by reference number 112, a mutual authentication call flow between the modem and the router can include an initial step in which the modem and the router establish a WLAN connection. For example, in some implementations, the WLAN connection can be established using Wi-Fi Protected Setup (WPS) and/or another suitable method.

As shown in FIG. 1C, and by reference number 114, the modem and the router can exchange respective certificates with one another. The exchanged certificates can include at least public keys associated with each respective device. For example, the public keys can be cryptographic keys used to encrypt messages intended for a particular recipient such that the encrypted messages can be deciphered using only the private key that is known only to the recipient (e.g., the private keys contained in the secure storage). Furthermore, the certificates can also include other identifying information associated with each device (e.g., the certificate provided to the modem can include the MAC address, serial number, and/or another suitable identifier associated with the router, and the certificate provided to the router can include the IMEI, serial number, and/or another suitable identifier associated with the modem).

As shown in FIG. 1C, and by reference number 116, the modem can verify whether the certificate received from the router was signed by the certificate authority operated by the network service provider associated with the modem. In particular, the modem can follow the chain associated with the router certificate, which should lead to the root certificate authority operated by the network service provider if the router is a device that the network service provider has authorized for installation at the customer premises. For example, the router certificate can be signed with a private key of its issuer, which in this case can be the subordinate certificate authority. The digital signature can be verified using the public key in the issuer's certificate (i.e., the public key in the subordinate certificate authority's certificate), which can be the next certificate in the certificate chain. The modem can verify the signature of the subordinate certificate authority's certificate in a similar manner until a chain of trust is established from the router certificate to the root certificate authority's certificate.

Furthermore, as shown in FIG. 1C, and by reference number 116, the modem can verify whether the identifier contained in the certificate received from the router appears in the whitelist based on the server-provisioned authorized router identifiers. As shown by reference number 118, similar verification can occur at the router side. In particular, in some implementations, the router can follow the chain associated with the modem certificate, which should lead to the root certificate authority operated by the network service provider if the modem is a device that the network service provider has authorized for deployment at the customer premises.

As shown in FIG. 1C, and by reference number 120, the WLAN connection can be dropped if the verification performed at either of reference numbers 116 or 118 fails. For example, the WLAN connection can be dropped based on the modem determining that the router certificate was not signed by the certificate authority operated by the network service provider and/or based on the modem determining that the identifier contained in the router certificate does not appear in the whitelist. Additionally, or alternatively, the WLAN connection can be dropped based on the router determining that the modem certificate was not signed by the certificate authority operated by the network service provider. In this way, the modem and the router can mutually verify that the other device was authorized for installation at the customer premises by the network service provider, and the modem can perform the further check against the whitelist to verify that the network service provider has specifically authorized communication between the modem and the router.

As shown in FIG. 1C, and by reference number 122, assuming that the modem and the router have mutually verified that one another have been authorized for installation at the customer premises by the network service provider and/or that the network service provider has authorized communication between the modem and the router, the modem can generate an ephemeral key pair for one-time use during the mutual authentication. For example, the ephemeral key pair generated by the modem can include a private ephemeral key known only to the modem and a public ephemeral key that can be used to encrypt messages intended for the modem, which can be decrypted using the private ephemeral key known only to the modem.

Furthermore, as shown in FIG. 1C, and by reference number 124, the router can optionally generate an ephemeral key pair for one-time use during the mutual authentication. For example, the ephemeral key pair generated by the router can include a private ephemeral key known only to the router and a public ephemeral key that can be used to encrypt messages intended for the router. In this way, the modem and the router can use the ephemeral key pair(s) to establish one or more shared secrets that can be used to secure communications between the modem and the router (e.g., using a Diffie-Hellman key exchange). Furthermore, because the shared secret(s) can be established using session-specific ephemeral keys, the shared secret(s) last for as long as the current session only, which can increase security because any compromise lasts at most the duration of the current session.

As shown in FIG. 1C, and by reference number 126, the modem can transmit, to the router, a mutual authentication request that includes the public ephemeral key generated at the modem. As shown by reference number 128, the router can calculate one or more shared secrets based on the public ephemeral key provided in the mutual authentication request and the private key contained in the secure storage, derive a keyset from the one or more shared secrets, and calculate a receipt based on the derived keyset. As shown by reference number 130, the router can transmit, to the modem, a mutual authentication response that includes the receipt calculated at the router and optionally further includes the public ephemeral key generated at the router. As shown by reference number 132, the modem can similarly calculate one or more shared secrets based on the private ephemeral key generated at the modem and the public key contained in the certificate previously received from the router. The modem can derive a keyset from the one or more shared secrets and use the derived keyset to verify the receipt provided in the mutual authentication response.

For example, in some implementations where the router does not generate an ephemeral key pair, the shared secrets that the router calculates at reference number 128 can include a single shared secret calculated from the public ephemeral key provided in the mutual authentication request in combination with the private key contained in the secure storage at the router. In such implementations, the shared secret that the modem calculates at reference number 132 can include a single shared secret that is calculated from the private ephemeral key in combination with the public key contained in the certificate previously received from the router. Assuming that the modem and the router are both following the correct key exchange protocol (e.g., using the Elliptic Curve Key Agreement algorithm as part of a Diffie-Hellman key exchange), the receipt calculated at the modem should match the receipt contained in the mutual authentication response from the router. For example, a hash-based key derivation function (KDF) can be used to derive the keyset from the mutually calculated shared secrets, which can lengthen and thus strengthen the key(s) used to secure communications between the modem and the router or obtain keys in a given format (e.g., converting a group element resulting from the Diffie-Hellman key exchange into a symmetric key for use with the Advanced Encryption Standard (AES)). In this way, although the shared secrets can be used directly as the key in some implementations, performing the hash-based KDF on the shared secrets can improve security by removing one or more weak bits due to the Diffie-Hellman key exchange.

Alternatively, in implementations where the router generates an ephemeral key pair at reference number 124, the shared secrets that the router calculates at reference number 128 can include a first shared secret based on the public key contained in the certificate received from the modem in combination with the private key contained in the router's secure storage as well as a second shared secret that is based on the modem's public ephemeral key that was received in the mutual authentication request in combination with the private ephemeral key generated at the router. In such implementations, the router can derive the keyset from the first shared secret and the second shared secret and calculate the receipt based on the derived keyset. Furthermore, in such implementations, the mutual authentication response provided to the modem can additionally include the public ephemeral key that was generated at the router to thereby provide the modem with the appropriate information to calculate the first and second shared secrets. For example, as shown by reference number 132, the modem can calculate a first shared secret based on the public key contained in the certificate received from the router in combination with the private key contained in the modem's secure storage as well as a second shared secret that is based on the router's public ephemeral key that was received in the mutual authentication response in combination with the private ephemeral key generated at the modem. In this way, the modem can derive the keyset from the first shared secret and the second shared secret and calculate the receipt based on the derived keyset.

As shown in FIG. 1C, and by reference number 134, the WLAN connection can be dropped if the receipt is unverified; otherwise, as shown by reference number 136, the WLAN connection can be maintained, and the keyset derived from the previously calculated shared secret(s) can be used to encrypt or otherwise secure communications via the WLAN connection. In this way, the modem and the router can perform the mutual authentication procedure to verify that both devices were authorized for installation at the customer premises by the same network service provider (e.g., based on initial the certificate exchange), to verify that the network service provider specifically authorized communication between the modem and the router (e.g., based on the additional check against the whitelist), and/or to verify that the certificates issued to the respective devices have not been compromised (e.g., based on the Diffie-Hellman key exchange).

Figure 1D:
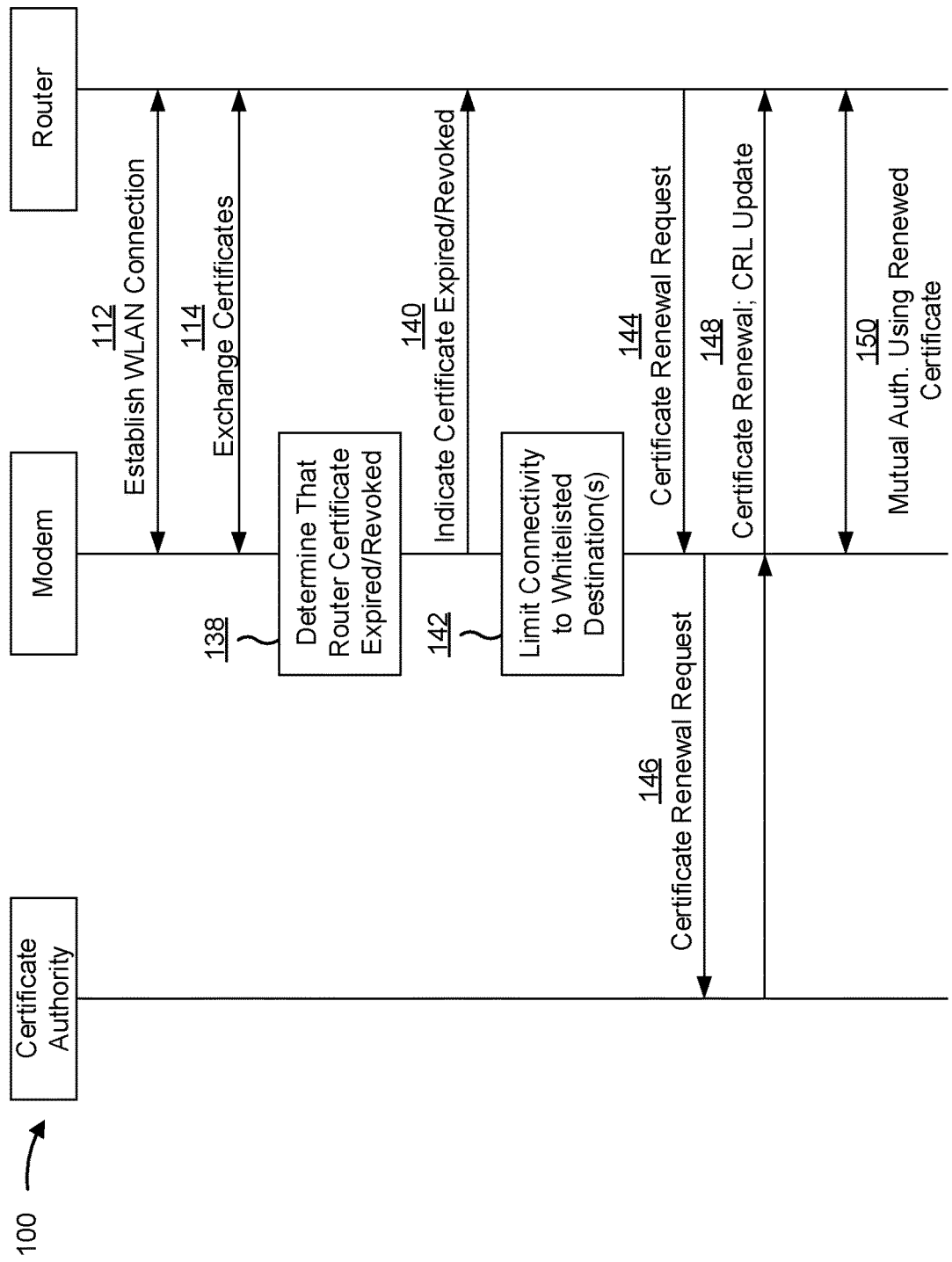

As shown in FIG. 1D, and by reference number 138, in some implementations, the modem can determine that the certificate received from the router has expired or been revoked (e.g., where the router certificate appears in the modem's CRL). For example, in some implementations, the router might have been installed at a customer premises and taken out-of-service for some time before being reactivated. Accordingly, when the router has a certificate that was properly issued by the certificate authority operated by the network service provider but the certificate has either expired or been revoked, the modem can indicate to the router that the certificate has expired or been revoked, as shown by reference number 140.

As shown in FIG. 1D, and by reference number 142, the modem can limit connectivity to only one or more whitelisted destinations. For example, in some implementations, the one or more whitelisted destinations can include one or more IP addresses or Uniform Resource Locators (URLs) that correspond to the certificate authority operated by the network service provider and/or one or more other servers operated by the network service provider (e.g., the server that maintains the one or more unique identifiers associated with the router paired with the modem). In this way, the modem can block connectivity to the WAN because the router does not have a certificate that is currently deemed to be trustworthy. Nonetheless, the modem can provide the router with sufficient external connectivity to allow the router to renew the certificate with the appropriate certificate authority, update the CRL as needed, and reattempt the mutual authentication procedure.

As shown in FIG. 1D, and by reference number 144, the router can thus initiate a certificate renewal request that includes a destination address. As shown in FIG. 1D, and by reference number 146, the modem can allow the certificate renewal request to proceed if the destination address corresponds to the certificate authority operated by the network service provider or another suitable address that matches one of the whitelisted destinations. As shown in FIG. 1D, and by reference number 148, the router can receive a certificate renewal and updated CRL from the certificate authority. As shown in FIG. 1D, and by reference number 150, the modem and the router can perform the mutual authentication procedure using the renewed certificate based on the Diffie-Hellman key exchange, as described in further detail above.

As indicated above, FIGS. 1A-1D are provided merely as an example. Other examples can differ from what was described with regard to FIGS. 1A-1D.

Figure 2:
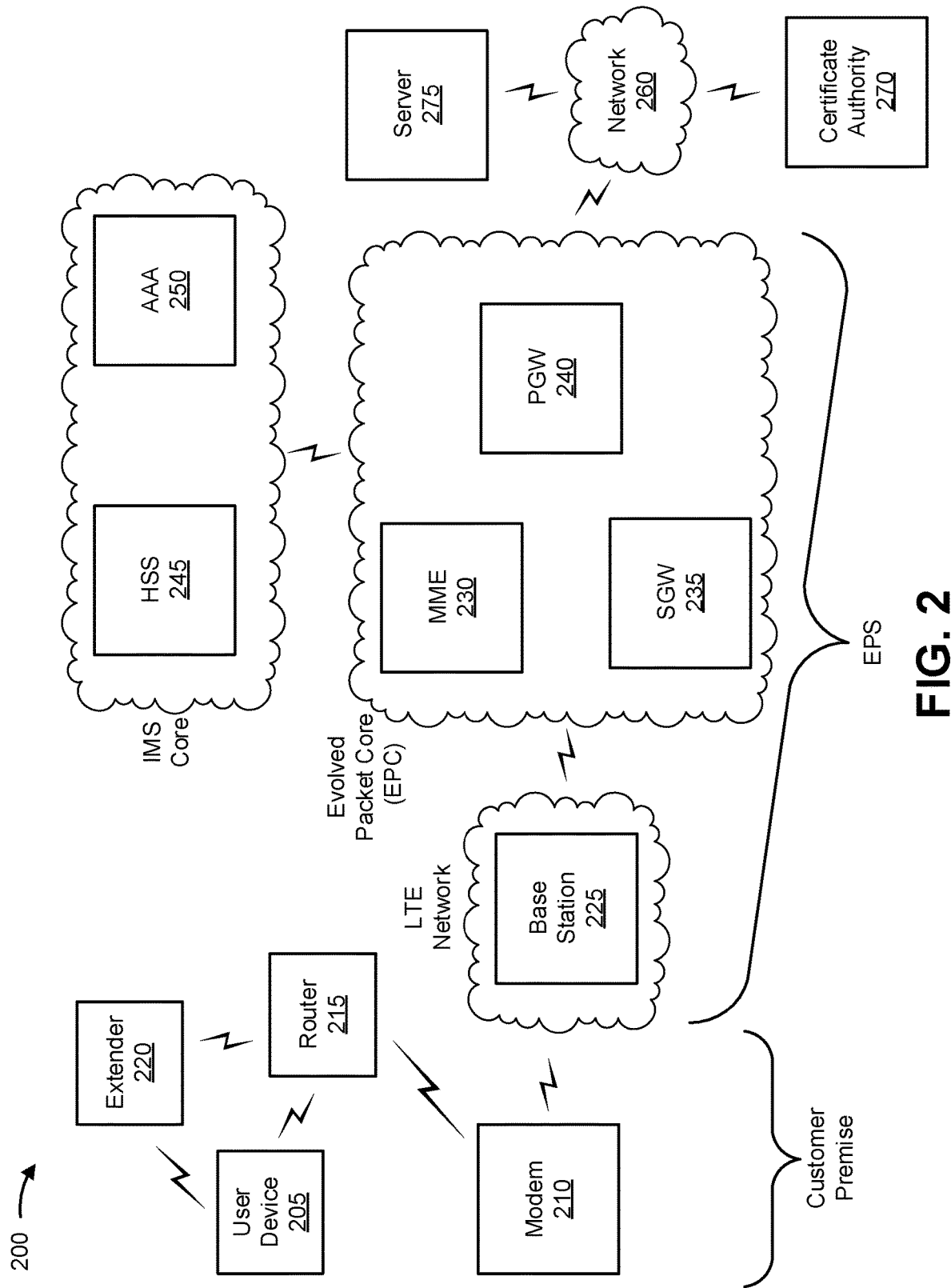
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a user device 205; a modem 210; a router 215; an extender 220; a base station 225; a mobility management entity device (MME) 230; a serving gateway (SGW) 235; a packet data network gateway (PGW) 240; a home subscriber server (HSS) 245; an authentication, authorization, and accounting server (AAA) 250; a network 260; a certificate authority 270; and/or a server 275. Devices of environment 200 can interconnect via wired connections, wireless connections, or a combination of wired and wireless connections.

Some implementations are described herein as being performed within a Long-Term Evolution (LTE) network for explanatory purposes. Some implementations can be performed within a network that is not an LTE network, such as a 3G network or a 5G network. With a 5G network, one or more of the devices and/or functions described herein can be virtualized and performed within a cloud computing environment and/or by one or more devices different than those described herein.

Environment 200 can include an evolved packet system (EPS) that includes an LTE network and/or an evolved packet core (EPC) that operate based on a Third Generation Partnership Project (3GPP) wireless communication standard. The LTE network can include a radio access network (RAN) that includes one or more base stations 225 (e.g., cells) that take the form of evolved Node Bs (eNBs) via which user device 205 communicates with the EPC. The EPC can include MME 230, SGW 235, and/or PGW 240 that enable user device 205 to communicate with network 260 (e.g., via a packet data network (PDN) connection) and/or an Internet protocol (IP) multimedia subsystem (IMS) core. The IMS core can include HSS 245 and/or AAA 250, and can manage device registration and authentication, session initiation, and/or the like, associated with user devices 205. HSS 245 and/or AAA 250 can reside in the EPC and/or the IMS core. HSS 245 can determine and/or generate a PDN priority list, which MME 230 can use to cause SGW 235 and/or PGW 240 to establish, suspend, and/or terminate a connection to a PDN.

Environment 200 can further include a customer premises where a network service provider has deployed modem 210, router 215, and/or extender 220 to enable user device 205 to connect to network 260. For example, modem 210 includes one or more devices that have a wired or wireless connection to the LTE network, whereby the modem 210 can deliver broadband network access to user device 205 at the customer premises. Router 215 includes one or more devices that are connected to the modem 210 via a wired (e.g., Ethernet) connection and/or a wireless (e.g., WLAN) connection. For example, in some implementations, modem 210 and router 215 can establish a WLAN connection via Wi-Fi Protected Setup (WPS) and perform a mutual authentication procedure based on asymmetric keys (e.g., Elliptic Curve keys) and a Diffie-Hellman key exchange, as described in further detail above with reference to FIGS. 1A-1D. Router 215 can generally be configured as a network gateway at the customer premises and act as a Dynamic Host Configuration Protocol (DHCP) server that provides an access point for wired and wireless devices (e.g., user device 205, extender 220, and/or the like). In some implementations, extender 220 includes one or more devices that can connect to router 215 via a WLAN connection and rebroadcast wireless signals transmitted by router 215, thereby extending the wireless range of the WLAN at the customer premises.

User device 205 includes one or more devices capable of communicating with base station 225 and/or a network (e.g., network 260) via router 215 and/or extender 220. For example, user device 205 can include a wireless communication device, a radiotelephone, a personal communications system (PCS) terminal (e.g., that can combine a cellular radiotelephone with data processing and data communications capabilities), a smart phone, a wearable computing device, a laptop computer, a tablet computer, a personal gaming system, an Internet of Things (IoT) device (e.g., a narrow-band IoT (NB-IoT) device), and/or a similar device. User device 205 can send traffic to and/or receive traffic from network 260 (e.g., via router 215, modem 210, base station 225, SGW 235, PGW 240, and/or a connection to a PDN).

Base station 225 (e.g., sometimes also referred to as a cell, or cell site) includes one or more devices capable of transferring traffic, such as audio, video, text, and/or other traffic, destined for and/or received from user device 205. In some implementations, base station 225 can include an eNB associated with the LTE network that receives traffic from and/or sends traffic to network 260 via SGW 235 and/or PGW 240. Additionally, or alternatively, one or more base stations 225 can be associated with a RAN that is not associated with the LTE network. Base station 225 can send traffic to and/or receive traffic from user device 205 via an air interface. In some implementations, base station 225 can include a small cell base station, such as a base station of a microcell, a picocell, and/or a femtocell. In some implementations, base station 225 can be associated with a 4G LTE cell, a 5G NR cell, a 5G NR sub-6 GHz cell, a 5G NR mmWave cell, and/or the like.

MME 230 includes one or more devices, such as one or more server devices, capable of managing authentication, activation, deactivation, and/or mobility functions associated with user device 205. In some implementations, MME 230 can perform operations relating to authentication of user device 205. Additionally, or alternatively, MME 230 can facilitate the selection of a particular SGW 235 and/or a particular PGW 240 to serve traffic to and/or from user device 205. MME 230 can perform operations associated with handing off user device 205 from a first base station 225 to a second base station 225 when user device 205 is transitioning from a first cell associated with the first base station 225 to a second cell associated with the second base station 225. Additionally, or alternatively, MME 230 can select another MME (not shown in FIG. 2), to which user device 205 should be handed off (e.g., when user device 205 moves out of range of MME 230). In some implementations, MME 230 can receive a connection request from user device 205 (e.g., via base station 225), can send a message to SGW 235 to create, suspend, restore, and/or terminate a PDN connection, and/or the like.

SGW 235 includes one or more devices capable of routing packets. For example, SGW 235 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 235 can aggregate traffic received from one or more base stations 225 associated with the LTE network, and can send the aggregated traffic to network 260 (e.g., via PGW 240) and/or other network devices associated with the EPC and/or the IMS core. SGW 235 can also receive traffic from network 260 and/or other network devices, and can send the received traffic to user device 205 via base station 225. Additionally, or alternatively, SGW 235 can perform operations associated with handing off user device 205 to and/or from an LTE network. In some implementations, SGW 235 can send a signal to a PGW 240 to create, suspend, restore, and/or terminate a PDN connection.

PGW 240 includes one or more devices capable of providing connectivity for user device 205 to external packet data networks (e.g., other than the depicted EPC and/or LTE network). For example, PGW 240 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 240 can aggregate traffic received from one or more SGWs 235, and can send the aggregated traffic to network 260. Additionally, or alternatively, PGW 240 can receive traffic from network 260, and can send the traffic to user device 205 via SGW 235 and base station 225. PGW 240 can record data usage information (e.g., byte usage), and can provide the data usage information to AAA 250. In some implementations, the PGW 240 can create, suspend, restore, and/or terminate a PDN connection.

HSS 245 includes one or more devices, such as one or more server devices, capable of managing (e.g., receiving, generating, storing, processing, and/or providing) information associated with user device 205. For example, HSS 245 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, and/or the like), and/or similar information. HSS 245 can provide this information to one or more other devices of environment 200 to support the operations performed by those devices. In some implementations, HSS 245 can generate, determine, and/or maintain a PDN priority list, and can provide the PDN priority list to MME 230.

AAA 250 includes one or more devices, such as one or more server devices, that perform authentication, authorization, and/or accounting operations for communication sessions associated with user device 205. For example, AAA 250 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, and/or the like), can track resources consumed by user device 205 (e.g., a quantity of voice minutes consumed, a quantity of data consumed, and/or the like), and/or can perform similar operations.

Network 260 includes one or more wired and/or wireless networks. For example, network 260 can include a cellular network (e.g., an LTE network, a 3G network, a 5G network, a code division multiple access (CDMA) network, and/or the like), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Certificate authority 270 includes one or more devices capable of storing, processing, and/or routing information that can be used in a mutual authentication procedure (e.g., between modem 210 and router 215, between router 215 and extender 220, and/or the like). For example, in some implementations, certificate authority 270 can include a communication interface that allows certificate authority 270 to receive information from and/or transmit information to other devices in environment 200 (e.g., to receive requests for a certificate, requests to update a certificate revocation list, and/or the like from other devices in environment 200, and to transmit certificates, an updated CRL, and/or the like to other devices in environment 200).

Server 275 includes one or more devices capable of storing, processing, and/or routing information associated with provisioning modem 210 with one or more unique identifiers associated with the router 215 (e.g., a Media Access Control (MAC) address, a serial number, and/or the like). In some implementations, server 275 may include a communication interface that allows server 275 to receive information from and/or transmit information to other devices in environment 200 (e.g., to receive requests for the one or more unique identifiers associated with router 215, to transmit or otherwise provision modem 210 with the one or more unique identifiers associated with router 215, and/or the like).

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
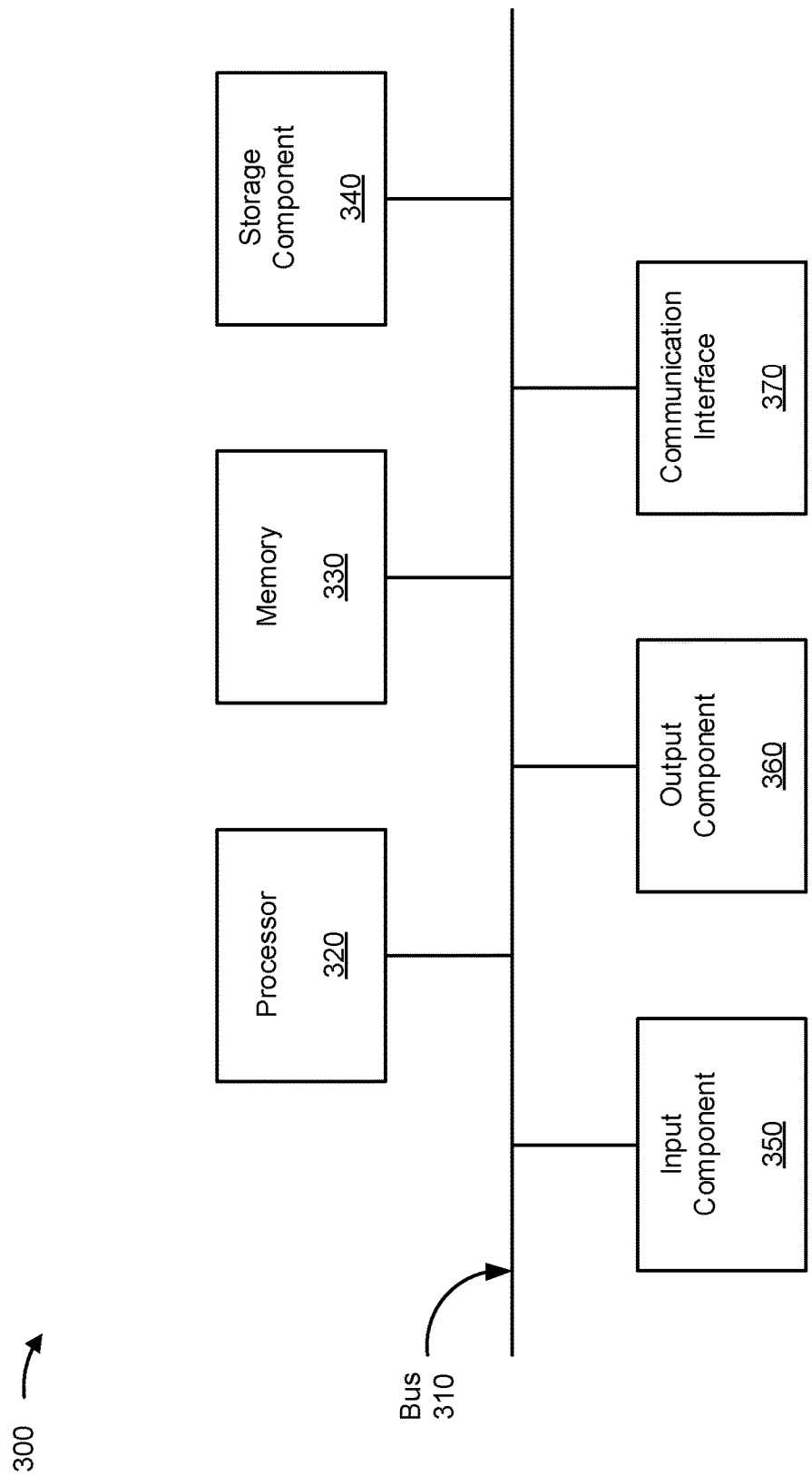
FIG. 3 is a diagram of example components of one or more devices of FIG. 2.

FIG. 3 is a diagram of example components of a device 300. Device 300 can correspond to user device 205, modem 210, router 215, extender 220, certificate authority 270, server 275, and/or another suitable device. In some implementations, user device 205, modem 210, router 215, extender 220, certificate authority 270, and/or server 275 can include one or more devices 300 and/or one or more components of device 300. As shown in FIG. 3, device 300 includes a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 can include a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 could include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 could include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 might perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 might include additional components, fewer components, different components, or differently arranged components than those shown in FIG. 3. Additionally, or alternatively, a set of components (e.g., one or more components) of device 300 could perform one or more functions described as being performed by another set of components of device 300.

Figure 4:
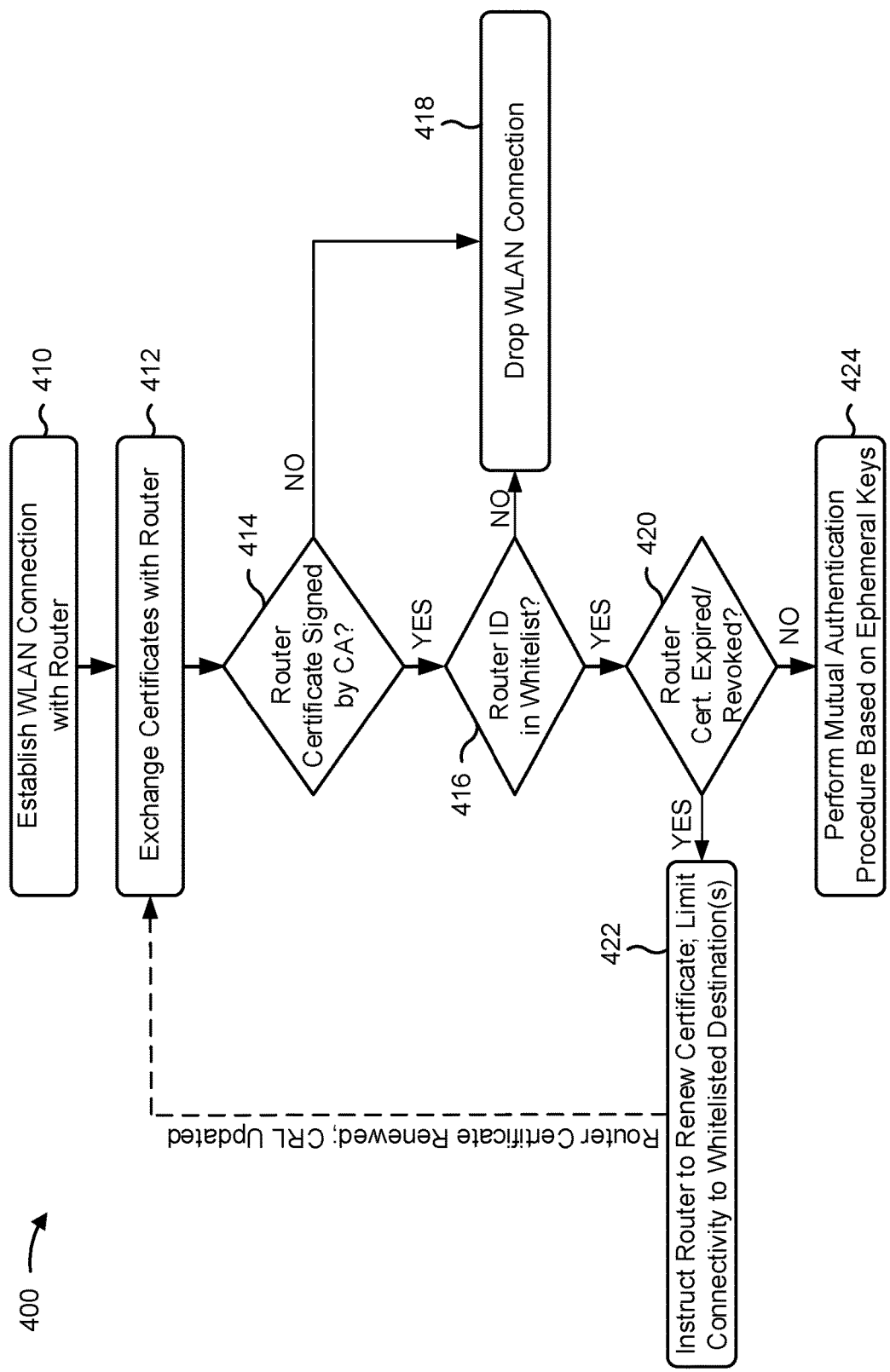
FIG. 4 is a flow chart of an example process for verifying an identity of a wireless access device.

FIG. 4 is a flow chart of an example process 400 for verifying an identity of a wireless access device. FIG. 4 shows an example of a first phase in a mutual authentication procedure that can be performed between a first wireless access device (e.g., a modem (e.g., modem 210) that provides WAN connectivity) and a second wireless access device (e.g., a router (e.g., router 215) that serves as a network gateway and acts as an access point through which wired and/or wireless devices can access the WAN). In some implementations, one or more process blocks of FIG. 4 can be performed by the first wireless access device (e.g., modem 210). In some implementations, one or more process blocks of FIG. 4 can be performed by another device or a group of devices separate from or including the first wireless access device (e.g., router 215 and/or extender 220).

As shown in FIG. 4, process 400 can include establishing a WLAN connection with the router (block 410). For example, as described above, the modem and the router can establish the WLAN connection via Wi-Fi Protected Setup (WPS) and/or another suitable method.

As further shown in FIG. 4, process 400 can include exchanging certificates with the router (block 412). For example, as described above, the modem can be a customer premises equipment authorized for installation by a network service provider that operates a certificate authority configured to issue a certificate to the modem. Accordingly, when exchanging the certificates with the router, the modem can provide the router with the certificate issued by the certificate authority operated by the network service provider and receive a certificate from the router. The certificate provided to the router can generally include at least a public key (e.g., an Elliptic Curve key, an RSA key, and/or the like) and the certificate received from the router can likewise include a public key. Furthermore, in some implementations, the certificate received from the router can include a unique identifier associated with the router, such as a MAC address, a serial number, and/or the like.

As further shown in FIG. 4, process 400 can include determining whether the certificate received from the router is signed by the certificate authority operated by the network service provider (block 414). As described above, a certificate chain generally refers to a sequence of certificates, where each certificate in the chain is signed by the subsequent certificate, eventually resulting in a tree structure (e.g., as shown in FIG. 1B by reference number 102). A certificate chain thus traces the path of a certificate from a branch to the root in the hierarchy. The root certificate is a self-signed, topmost certificate of the tree and is generated first. A self-signed certificate is a certificate for which an issuer or signer of the certificate is the same as a subject or owner of the certificate. The certificates that are directly subordinate to the root certificate can be signed by the root certificate. All certificates below the root certificate thus inherit the trustworthiness of the root certificate. Accordingly, when determining whether the router certificate is signed by the certificate authority operated by the network service provider, the modem is attempting to establish a chain of trust from the router certificate to a trusted root certificate (i.e., a certificate associated with the root certificate authority operated by the network service provider). In this way, the modem can determine whether the network service provider has also authorized installation of the router at a customer premises.

As further shown in FIG. 4, process 400 can include determining whether the unique identifier associated with the router (e.g., as contained within the router certificate) appears in a whitelist stored at the modem (block 416) based on a determination that the router certificate is signed by the certificate authority operated by the network service provider. For example, as described above, a server or other suitable device associated with the network service provider can provision the modem with one or more identifiers (e.g., MAC addresses, serial numbers, and/or the like) that correspond to devices that are authorized to communicate with the modem. The whitelist stored at the modem can include the one or more identifiers that correspond to the devices that are authorized to communicate with the modem. For example, in some implementations, the one or more identifiers can be preloaded in a secure environment, provisioned over-the-air or over a wired connection at boot up, and/or provided to the modem at another suitable time. In this way, by determining whether the unique identifier contained in the certificate received from the router matches one of the unique identifiers contained in the whitelist, the modem accepts connections only from devices that the network service provider has been specifically authorized to communicate with the modem.

As further shown in FIG. 4, process 400 can further include dropping the WLAN connection (block 418) based on a determination that the router certificate is not signed by the certificate authority operated by the network service provider and/or a determination that the unique identifier associated with the router does not appear in the whitelist stored at the modem. In this way, the modem can block connections from devices that do not have a certificate issued by the certificate authority operated by the network service provider and also block connections from devices that the network service provider has not specifically authorized for communication with the modem despite having a certificate issued by the certificate authority operated by the network service provider.

As further shown in FIG. 4, process 400 can include determining whether the certificate received from the router has expired or been revoked (block 420) based on a determination that the router certificate is signed by the certificate authority operated by the network service provider in combination with a determination that the unique identifier associated with the router appears in the whitelist stored at the modem. For example, as described above, a certificate can generally include an expiration date after which the certificate should no longer be trusted. Furthermore, for various reasons, a certificate authority might revoke a previously issued certificate prior to the expiration date (e.g., where the subordinate certificate authority that issued the certificate was compromised). As such, even though the router might have a certificate that was signed by the certificate authority operated by the network service provider and a unique identifier that appears in the whitelist, there can be certain circumstances where the certificate is nonetheless considered invalid or otherwise untrustworthy because the expiration date has passed and/or the certificate appears in a certificate revocation list (CRL).

As further shown in FIG. 4, process 400 can further include instructing the router to renew its certificate and limiting connectivity to one or more whitelisted destinations (block 422) based on a determination that the router certificate is expired and/or revoked. For example, as described above, the modem can allow the router to connect to the certificate authority operated by the network service provider and/or one or more other servers associated with the network service provider to provide the router with the ability to renew the certificate, update the CRL, and/or the like. In this regard, the one or more whitelisted destinations can include IP addresses, URLs, and/or other suitable destinations associated with the network service provider. If the router is able to appropriately renew the certificate and/or update the CRL through the service process, process 400 can include exchanging the renewed certificate with the router (block 412) and repeating the above operations.

As further shown in FIG. 4, process 400 can include performing a mutual authentication procedure based on one or more ephemeral keys (block 424) if the router certificate is signed by the certificate authority operated by the network service provider, the unique identifier associated with the router appears in the whitelist stored at the modem, and the router certificate is neither expired nor revoked. For example, as described in further detail above, at least the modem generates a session-specific one-time use ephemeral key pair (including a private ephemeral key and a public ephemeral key) that the modem and the router can use to mutually authenticate one another.

Although FIG. 4 shows example blocks of process 400, in some implementations, process 400 could include additional blocks, fewer blocks, different blocks, or differently arranged blocks than those depicted in FIG. 4. Additionally, or alternatively, two or more of the blocks of process 400 could be performed in parallel.

Figure 5:
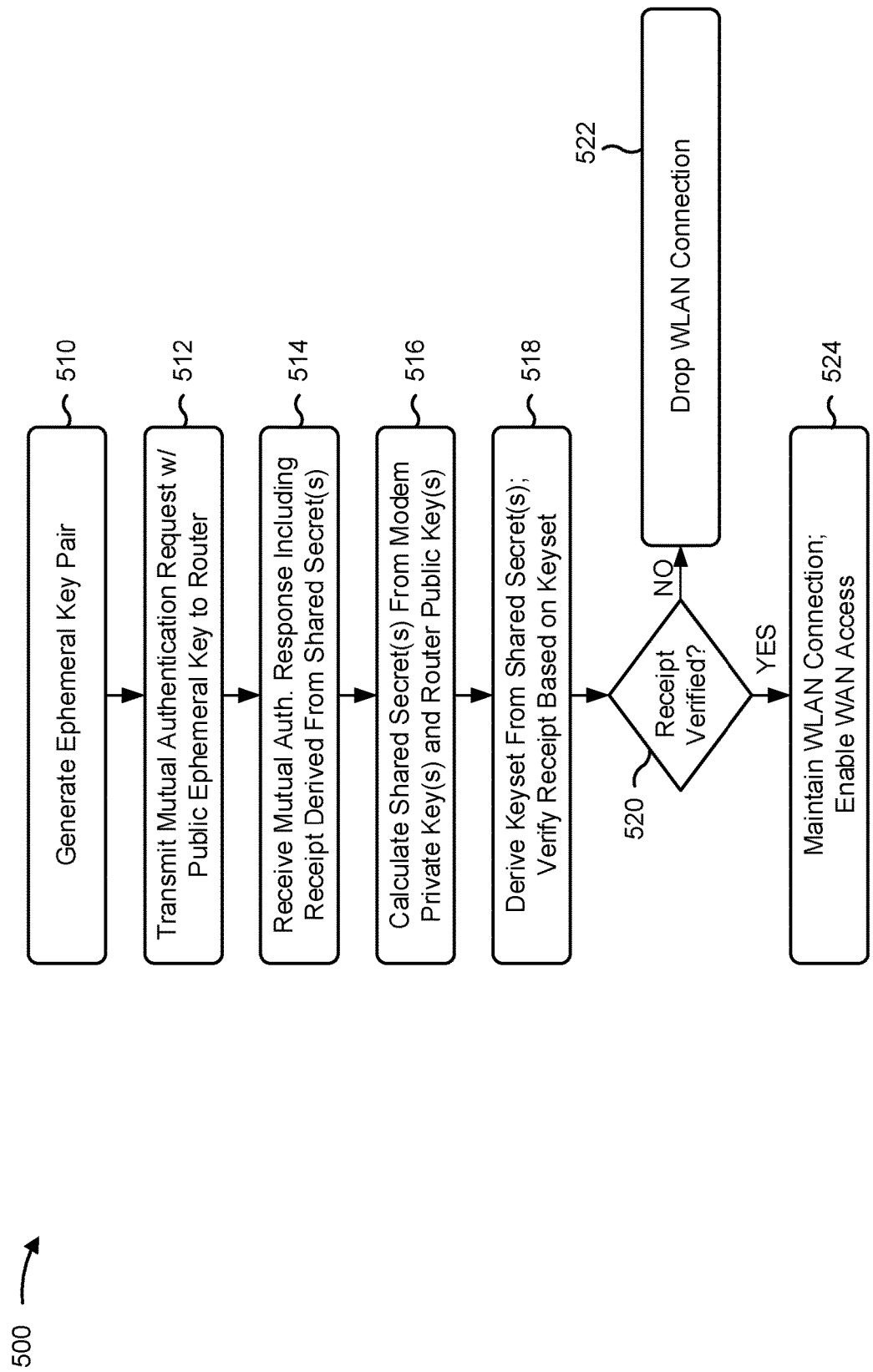
FIG. 5 is a flow chart of an example process for mutual authentication between wireless access devices using one or more ephemeral keys.

FIG. 5 is a flow chart of an example process 500 for mutual authentication between wireless access devices using one or more ephemeral keys. FIG. 5 shows an example of the mutual authentication procedure that can be performed in FIG. 4, block 424, when the modem determines that the router certificate is signed by the certificate authority operated by the network service provider, the unique identifier associated with the router appears in the whitelist stored at the modem, and the router certificate is neither expired nor revoked.

As shown in FIG. 5, process 500 can include generating an ephemeral key pair at the modem (block 510). For example, as described above, the ephemeral key pair can include a public ephemeral key and a private ephemeral key. In some implementations, the ephemeral key pair can include Elliptic Curve keys generated according to techniques described in Technical Guideline BSI TR-03111, "Elliptic Curve Cryptography," 2048-bit or higher RSA keys, and/or the like.

As further shown in FIG. 5, process 500 can include transmitting a mutual authentication request to the router (block 512). For example, in some implementations, the mutual authentication request can include the public ephemeral key.

As further shown in FIG. 5, process 500 can include receiving a mutual authentication response from the router (block 514). The mutual authentication response can include at least a receipt derived from one or more shared secrets calculated at the router. For example, in some implementations, the router might calculate a shared secret based on the public ephemeral key provided in the mutual authentication request in combination with a private key known only to the router. The router can derive a keyset from the shared secret and calculate the receipt provided in the mutual authentication response based on the keyset, as described above. Alternatively, in some implementations, the router can calculate a router-specific ephemeral key pair, including a public ephemeral key and a private ephemeral key. In such cases, the router might calculate a first shared secret based on a public key associated with the modem (which the router would have received during a previous certificate exchange with the modem) in combination with a private key known only to the router. Furthermore, the router might calculate a second shared secret based on the public ephemeral key received from the modem in the mutual authentication request in combination with the private ephemeral key generated at the router. The router can derive the keyset and calculate the receipt based on the first shared secret in combination with the second shared secret. Furthermore, in implementations where the router generates an ephemeral key pair and derives the receipt based on the first shared secret and the second shared secret, the mutual authentication response provided to the modem can also include the public ephemeral key generated at the router.

As further shown in FIG. 5, process 500 can include calculating one or more shared secrets based on one or more private keys associated with the modem and one or more public keys associated with the router (block 516). For example, as described above, the modem might calculate a shared secret based on the private ephemeral key generated at the modem in combination with the public key associated with the router. The public key associated with the router might have been received as part of the previous certificate exchange with the router. Alternatively, in implementations where the router calculates a router-specific ephemeral key pair, the modem might calculate a first shared secret based on the router's public key as-received during the previous certificate exchange with the modem in combination with the private key known only to the modem. Furthermore, the modem might calculate a second shared secret based on the public ephemeral key received from the router in the mutual authentication response in combination with the private ephemeral key generated at the modem.

As further shown in FIG. 5, process 500 can include deriving a keyset from the one or more shared secrets and verifying the receipt provided in the mutual authentication response based on the derived keyset (block 518). In some implementations, process 500 can include determining whether the receipt is verified (block 520). In some implementations, the WLAN connection between the modem and the router can be dropped if the receipt derived at the modem does not match the receipt provided in the mutual authentication response (block 522). Alternatively, in some implementations, the WLAN connection can be maintained and the modem can enable WAN access for the router if the receipt derived at the modem matches the receipt provided in the mutual authentication response (block 524).

Although FIG. 5 shows example blocks of process 500, in some implementations, process 500 could include additional blocks, fewer blocks, different blocks, or differently arranged blocks than those depicted in FIG. 5. Additionally, or alternatively, two or more of the blocks of process 500 could be performed in parallel.

Figure 6:
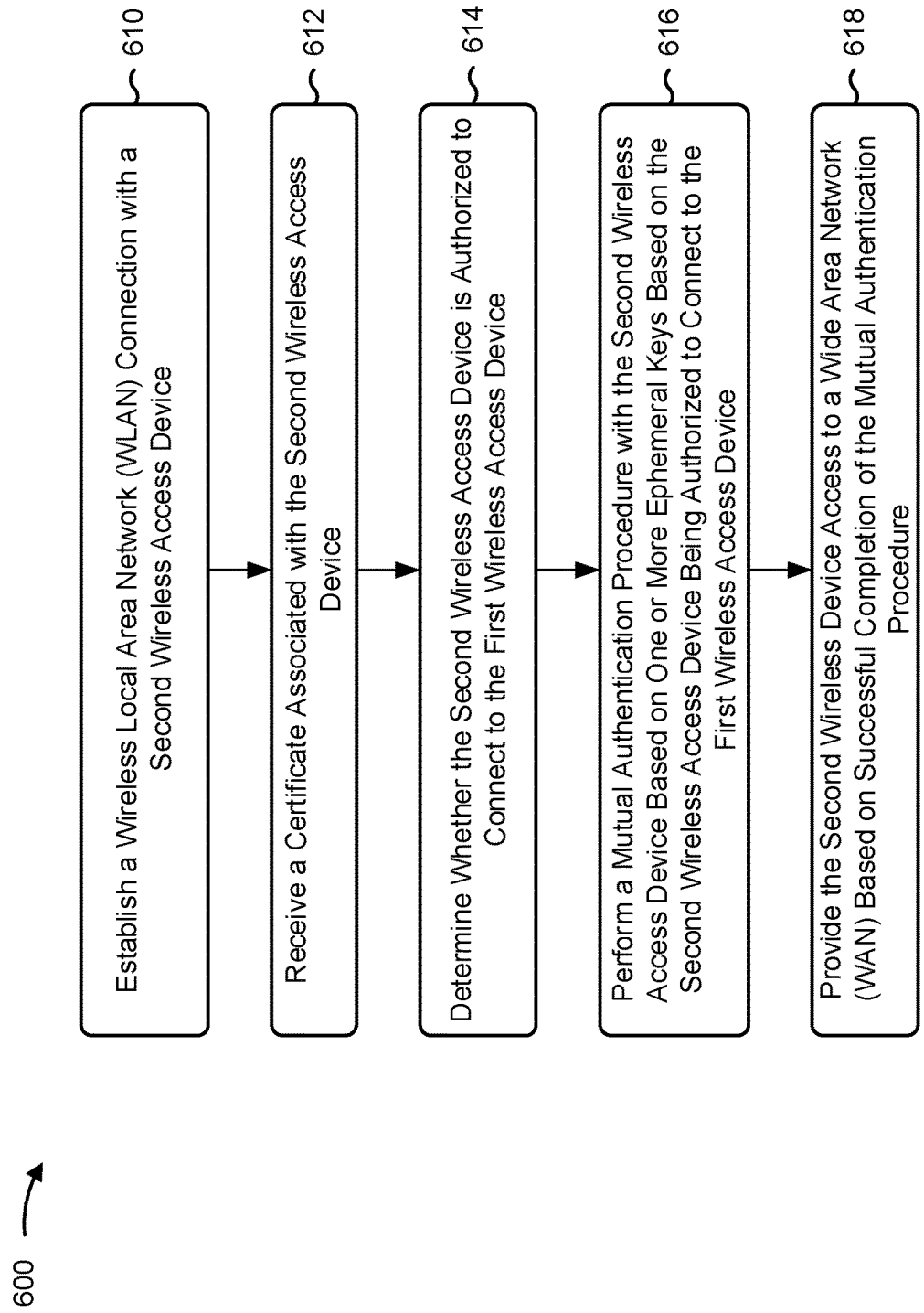
FIG. 6 is a flow chart of an example process for authenticating a wireless access device.

FIG. 6 is a flow chart of an example process 600 for authenticating a wireless access device. In some implementations, one or more process blocks of FIG. 6 can be performed by a first wireless access device (e.g., modem 210) associated with a network service provider. In some implementations, one or more process blocks of FIG. 6 can be performed by another device or a group of devices separate from or including the first wireless access device associated with the network service provider, such as a second wireless access device (e.g., router 215 and/or extender 220).

As shown in FIG. 6, process 600 can include establishing a wireless local area network (WLAN) connection with a second wireless access device (block 610). For example, the first wireless access device (e.g., using processor 320, memory 330, communication interface 370, and/or the like) can establish the WLAN connection with the second wireless access device, as described above.

As further shown in FIG. 6, process 600 can include receiving a certificate associated with the second wireless access device (block 612). For example, the first wireless access device (e.g., using processor 320, memory 330, communication interface 370, and/or the like) can receive the certificate associated with the second wireless access device, as described above. In some implementations, the certificate can include a unique identifier associated with the second wireless access device.

As further shown in FIG. 6, process 600 can include determining whether the second wireless access device is authorized to connect to the first wireless access device (block 614). For example, the first wireless access device (e.g. using processor 320, memory 330, and/or the like) can determine whether the second wireless access device is authorized to connect to the first wireless access device, as described above. In some implementations, the second wireless access device can be authorized to connect to the first wireless access device if the certificate associated with the second wireless access device is signed by a certificate authority associated with the network service provider and the unique identifier associated with the second wireless access device appears in a whitelist stored at the first wireless access device.

As further shown in FIG. 6, process 600 can include performing a mutual authentication procedure with the second wireless access device based on one or more ephemeral keys based on determining that the second wireless access device is authorized to connect to the first wireless access device (block 616). For example, the first wireless access device (e.g., using processor 320, memory 330, communication interface 370, and/or the like) can perform the mutual authentication procedure with the second wireless access device based on one or more ephemeral keys based on determining that the second wireless access device is authorized to connect to the first wireless access device, as described above.

As further shown in FIG. 6, process 600 can include providing the second wireless access device with access to a wide area network (WAN) based on successful completion of the mutual authentication procedure (block 618). For example, the first wireless access device (e.g., using processor 320, memory 330, communication interface 370, and/or the like) can provide the second wireless access device with access to the WAN based on successful completion of the mutual authentication procedure, as described above.

Process 600 can include additional implementations, such as any single implementation or any combination of implementations described below and/or in connection with one or more other processes described elsewhere herein.

For example, in some implementations, process 600 can further include dropping the WLAN connection based on the certificate associated with the second wireless access device not being signed by the certificate authority associated with the network service provider. Additionally, or alternatively, the WLAN connection can be dropped based on the unique identifier associated with the second wireless access device not appearing in the whitelist stored at the first wireless access device.

In some implementations, process 600 can further include determining, at the first wireless access device, that the certificate associated with the second wireless access device has expired or been revoked and limiting the access that the second wireless access device has to the WAN to one or more destination addresses enabling the second wireless access device to renew the certificate with the network service provider. For example, in some implementations, the mutual authentication procedure can be performed after the second wireless access device has renewed the certificate with the network service provider.

In some implementations, when performing the mutual authentication procedure with the second wireless access device (e.g., in block 616), process 600 can further include generating, at the first wireless access device, an ephemeral key pair including a private ephemeral key and a public ephemeral key and transmitting a mutual authentication request to the second wireless access device. For example, in some implementations, the mutual authentication request can include the public ephemeral key. Additionally, process 600 can include receiving, at the first wireless access device, a mutual authentication response from the second wireless access device. For example, in some implementations, the mutual authentication response can include a receipt calculated at the second wireless access device based on the public ephemeral key. Process 600 can further include calculating, at the first wireless access device, one or more shared secrets based on the private ephemeral key and a public key included in the certificate associated with the second wireless access device. For example, in some implementations, the one or more shared secrets can include at least one secret calculated from the private ephemeral key in combination with the public key included with the certificate associated with the second wireless access device. In another example, the one or more shared secrets can include a first secret calculated from a private key issued by the certificate authority associated with the network service provider in combination with the public key included with the certificate associated with the second wireless access device and a second secret calculated from the private ephemeral key in combination with a public ephemeral key generated at the second wireless access device. In some implementations, the public ephemeral key generated at the second wireless access device can be included with the mutual authentication response.

In some implementations, process 600 can further include providing the second wireless access device with the access to the WAN based on verifying that the second wireless access device correctly calculated the receipt based on the one or more shared secrets. Alternatively, in some implementations, process 600 can include dropping the WLAN connection based on the second wireless access device failing to correctly calculate the receipt based on the public ephemeral key.

Although FIG. 6 shows example blocks of process 600, in some implementations, process 600 could include additional blocks, fewer blocks, different blocks, or differently arranged blocks than those depicted in FIG. 6. Additionally, or alternatively, two or more of the blocks of process 600 could be performed in parallel.

The foregoing disclosure provides illustration and description, but is not intended to be exhaustive or to limit the implementations to the precise form disclosed. Modifications and variations can be made in light of the above disclosure or might be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below directly depends on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   establishing, by a first wireless access device associated with a network service provider, a wireless local area network (WLAN) connection with a second wireless access device;
   receiving, at the first wireless access device, a certificate associated with the second wireless access device,
      wherein the certificate includes a unique identifier associated with the second wireless access device;
   providing, by the first wireless access device, after determining whether the certificate is signed by a certificate authority and before performing a mutual authentication procedure with the second wireless access device, and based on determining that the certificate is expired or revoked, limited connectivity to the second wireless access device for one or more destinations that match a destination identifier in a whitelist,
      wherein the one or more destinations correspond to at least one of the certificate authority, or one or more servers that maintain one or more unique identifiers associated with one or more other devices that are paired with the second wireless access device;
   performing, by the first wireless access device and based on providing the limited connectivity to the second wireless access device, the mutual authentication procedure with the second wireless access device based on one or more ephemeral keys,
      wherein performing the mutual authentication procedure with the second wireless access device comprises:
         deriving a keyset from one or more shared secrets that are calculated based on a private ephemeral key and a public key included in the certificate;
         calculating a receipt based on the derived keyset; and
         determining whether the receipt is verified based on the derived keyset;
   maintaining the WLAN connection when the receipt is verified; and
   providing the second wireless access device with access to a wide area network (WAN) based on successful completion of the mutual authentication procedure.

2. The method recited in claim 1, further comprising:
   dropping the WLAN connection based on the certificate not being signed by the certificate authority, associated with the network service provider, or the unique identifier associated with the second wireless access device not appearing in the whitelist,
wherein the whitelist is stored at the first wireless access device.

3. The method recited in claim 1, further comprising dropping the WLAN connection when the receipt is not verified.

4. The method recited in claim 1, wherein determining whether the certificate is signed by the certificate authority comprises:
following a certificate chain and verifying signatures of certificates until a chain of trust is established from the certificate to a certificate associated with a root certificate authority operated by the network service provider,
wherein the certificate chain is a sequence of certificates where each certificate is signed by a subsequent certificate.

5. The method recited in claim 1, wherein the certificate authority updates a certificate revocation list (CRL) at the first wireless access device and the second wireless access device on a periodic or dynamic basis, and
wherein the CRL is a blacklist that identifies one or more certificates that the certificate authority no longer deems trustworthy.

6. The method of claim 1, further comprising:
instructing, based on determining that the certificate is expired or revoked, the second wireless access device to renew the certificate.

7. The method of claim 6, wherein the mutual authentication procedure is performed after the second wireless access device renews the certificate.

8. A first wireless access device associated with a network service provider, comprising:
one or more memories; and
one or more processors, communicatively coupled to the one or more memories, to:
establish a wireless local area network (WLAN) connection with a second wireless access device,
receive a certificate associated with the second wireless access device,
wherein the certificate includes a unique identifier associated with the second wireless access device;
provide, after determining whether the certificate is signed by a certificate authority and before performing a mutual authentication procedure with the second wireless access device, and based on determining that the certificate is expired or revoked, limited connectivity to the second wireless access device for one or more destinations that match a destination identifier in a whitelist,
wherein the one or more destinations correspond to at least one of the certificate authority, or one or more servers that maintain one or more unique identifiers associated with one or more other devices that are paired with the second wireless access device;
perform, based on providing the limited connectivity to the second wireless access device, the mutual authentication procedure with the second wireless access device based on one or more ephemeral keys,
wherein performing the mutual authentication procedure with the second wireless access device comprises:
derive a keyset from one or more shared secrets that are calculated based on a private ephemeral key and a public key included in the certificate;
calculate a receipt based on the derived keyset; and
determine whether the receipt is verified based on the derived keyset;
maintain the WLAN connection when the receipt is verified; and
provide the second wireless access device with access to a wide area network (WAN) based on successful completion of the mutual authentication procedure.

9. The first wireless access device recited in claim 8, wherein the one or more processors are further to:
drop the WLAN connection based on one or more of the certificate not being signed by the certificate authority, associated with the network service provider, or the unique identifier associated with the second wireless access device not appearing in the whitelist,
wherein the whitelist is stored at the first wireless access device.

10. The first wireless access device recited in claim 8, wherein the one or more processors are further to:
drop the WLAN connection when the receipt is not verified.

11. The first wireless access device recited in claim 8, the one or more processors, when determining whether the certificate is signed by the certificate authority, are further to:
follow a certificate chain and verify signatures of certificates until a chain of trust is established from the certificate to a certificate associated with a root certificate authority operated by the network service provider,
wherein the certificate chain is a sequence of certificates where each certificate is signed by a subsequent certificate.

12. The first wireless access device recited in claim 8, wherein the certificate authority updates a certificate revocation list (CRL) at the first wireless access device and the second wireless access device on a periodic or dynamic basis, and
wherein the CRL is a blacklist that identifies one or more certificates that the certificate authority no longer deems trustworthy.

13. The device of claim 8, wherein the one or more processors are further to:
instruct, based on determining that the certificate is expired or revoked, the second wireless access device to renew the certificate.

14. The device of claim 8, wherein the limited connectivity allows particular external connectivity to at least one of:
renewal of the certificate with an appropriate certificate authority, update a certificate revocation list, or reattempt the mutual authentication procedure.

15. A non-transitory computer-readable medium storing instructions, the instructions comprising:
one or more instructions that, when executed by one or more processors of a first wireless access device associated with a network service provider, cause the one or more processors to:
establish a wireless local area network (WLAN) connection with a second wireless access device,
receive a certificate associated with the second wireless access device,
wherein the certificate includes a unique identifier associated with the second wireless access device;
provide, after determining whether the certificate is signed by a certificate authority and before performing a mutual authentication procedure with the second wireless access device, and based on determining that the certificate is expired or revoked, limited connectivity to the second wireless access device for one or more destinations that match a destination identifier in a whitelist,
   wherein the one or more destinations correspond to at least one of the certificate authority, or one or more servers that maintain one or more unique identifiers associated with one or more other devices that are paired with the second wireless access device;
perform, based on providing the limited connectivity to the second wireless access device, the mutual authentication procedure with the second wireless access device based on one or more ephemeral keys based on determining that the second wireless access device is authorized to connect to the first wireless access device,
   wherein performing the mutual authentication procedure with the second wireless access device comprises:
      derive a keyset from one or more shared secrets that are calculated based on a private ephemeral key and a public key included in the certificate;
      calculate a receipt based on the derived keyset; and
      determine whether the receipt is verified based on the derived keyset;
maintain the WLAN connection when the receipt is verified; and
provide the second wireless access device with access to a wide area network (WAN) based on successful completion of the mutual authentication procedure.

16. The non-transitory computer-readable medium recited in claim 15, wherein the one or more instructions, when executed by the one or more processors, further cause the one or more processors to:
drop the WLAN connection based on one or more of the certificate not being signed by the certificate authority, associated with the network service provider, or the unique identifier associated with the second wireless access device not appearing in the whitelist
   wherein the whitelist is stored at the first wireless access device.

17. The non-transitory computer-readable medium recited in claim 15, wherein the one or more instructions, when executed by the one or more processors, further cause the one or more processors to:
drop the WLAN connection when the receipt is not verified.

18. The non-transitory computer-readable medium recited in claim 15, wherein the one or more instructions, that cause the one or more processors to determine whether the certificate is signed by the certificate authority, cause the one or more processors to:
follow a certificate chain and verify signatures of certificates until a chain of trust is established from the certificate to a certificate associated with a root certificate authority operated by the network service provider,
   wherein the certificate chain is a sequence of certificates where each certificate is signed by a subsequent certificate.

19. The non-transitory computer-readable medium recited in claim 15, wherein the certificate authority updates a certificate revocation list (CRL) at the first wireless access device and the second wireless access device on a periodic or dynamic basis, and
   wherein the CRL is a blacklist that identifies one or more certificates that the certificate authority no longer deems trustworthy.

20. The non-transitory computer-readable medium recited in claim 15, wherein the one or more instructions, when executed by the one or more processors, further cause the one or more processors to:
instruct, based on determining that the certificate is expired or revoked, the second wireless access device to renew the certificate.

* * * * *